March 14, 1944.   C. C. RICHARDS   2,344,413
DRIVE FASTENER
Filed Aug. 1, 1942   2 Sheets-Sheet 1
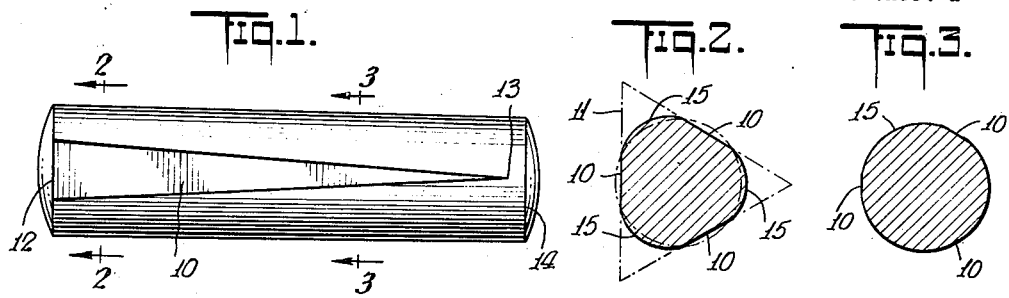
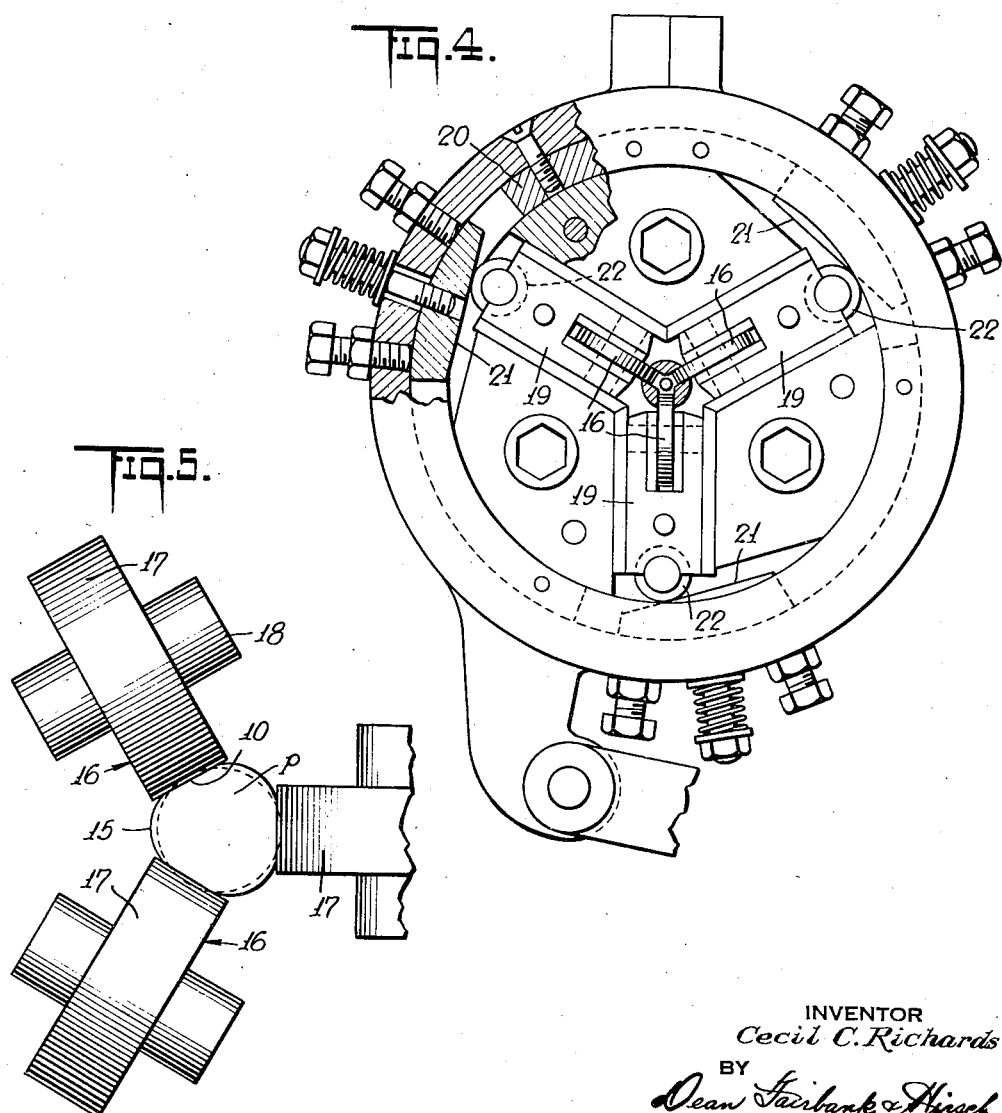
INVENTOR
*Cecil C. Richards*
BY
*Dean Fairbank & Hirsch*
ATTORNEYS March 14, 1944.   C. C. RICHARDS   2,344,413
DRIVE FASTENER
Filed Aug. 1, 1942   2 Sheets-Sheet 2
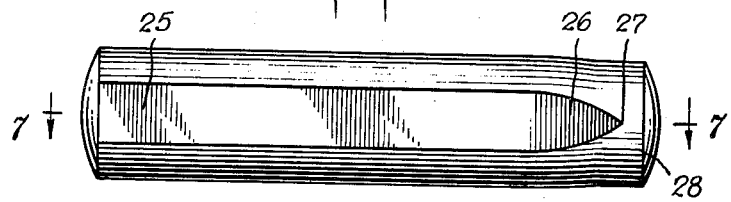
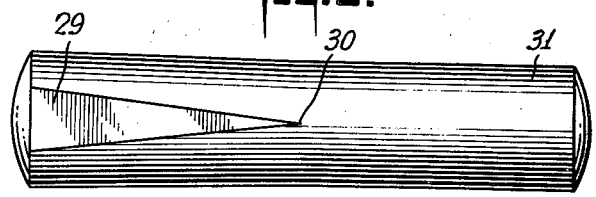
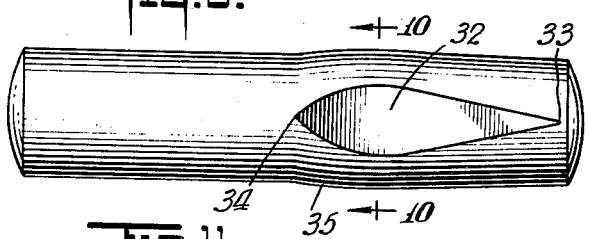
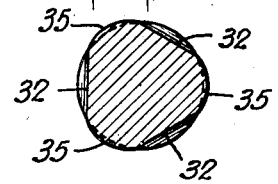
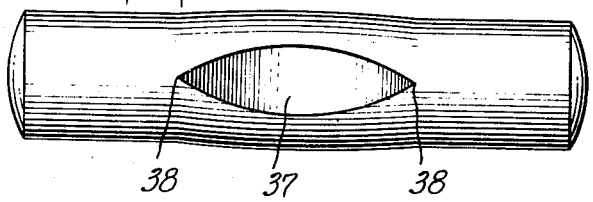
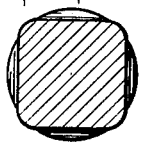
INVENTOR
Cecil C. Richards
BY
Dean Fairbank & Hirsch
ATTORNEYS Patented Mar. 14, 1944

2,344,413

UNITED STATES PATENT OFFICE 2,344,413

DRIVE FASTENER

Cecil C. Richards, West New York, N. J., assignor to Groov-Pin Corporation, Union City, N. J., a corporation of New York Application August 1, 1942, Serial No. 453,231

5 Claims. (Cl. 85—10)

The present invention is concerned with drive fasteners of the type to be forced into a bore by a wedge fit and retained by the consequent resilient compression of the metal thereof.

It is an object of the invention to provide a drive fastener devoid of threads or grooves, which inherently admits of ready introduction, without excessive or destructive strain upon the fastener or upon the article into which it is driven and affords a particularly secure frictional hold.

Another object is to provide a method of producing a fastener of the above type which dispenses with the need for knife edges on the forming tool, and therefore results in longer tool life and not only avoids the danger of chipping the tool or weakening the fastener, but on the contrary inherently results in toughening the fastener pin in the course of fabrication thereof and to a degree more or less proportionate to the strain subsequently to be imposed upon the fastener in the course of driving the same into its bore.

The drive pin, in its various embodiments, comprises a generally cylindrical piece, ordinarily of machine steel or other material suited to the purpose for which the fastener is designed, and provided preferably with symmetrically arranged flats thereon, with the surface of the pin bulging outward at the spans intervening between the flats and to an extent varying in a direct proportion to the width of the flat at each transverse cross-section of the pin. Desirably, the pin is made by drawing or forging a piece of cylindrical stock so that the bulge is formed by the material displaced in producing the flats and the stock is incidentally toughened in the kneading operation involved.

In the accompanying drawings in which are shown one or more of various possible embodiments of the several features of this invention, Fig. 1 is a side elevation of one embodiment of drive fastener, Figs. 2 and 3 are views in transverse cross-section, taken respectively on lines 2—2 and 3—3 of Fig. 1, Fig. 4 is a front elevation of a preferred form of cam operated die construction for fabricating the drive fastener, Fig. 5 is a view on a larger scale of the central or metal working portion of Fig. 4, Fig. 6 is a view similar to Fig. 1 of a modified form of drive fastener, Fig. 7 is a fragmentary view in longitudinal cross-section taken on line 7—7 of Fig. 6, Figs. 8, 9 and 11 are views similar to Fig. 1 of alternative embodiments, Fig. 10 is a view in longitudinal cross-section taken on line 10—10 of Fig. 9, and Fig. 12 is a view in transverse cross-section of a further modification.

Referring now to Figs. 1, 2 and 3 of the drawings, the pin is shown with a plurality, illustratively three flats 10, equally spaced peripherally of the pin and of equal width along each transverse cross-section of the pin. As shown in the drawings, the flats are preferably identical and symmetrically arranged with respect to the axis of the pin to lie along the sides of a regular inscribing polygon, in the embodiment shown an equilateral triangle 11 inscribing the corresponding section of the pin.

Each flat in the embodiment of Figs. 1, 2 and 3 is of maximum width at one end of the pin as at 12 and tapers or becomes progressively narrower toward the other end of the pin, and as shown, the flats are triangular in shape, and their apices 13 are near the latter end of the pin, and merge with the surface thereof at said end, which is of normal or circular cross-section, as at 14.

The surface spans 15 of the pin between consecutive flats, bulge outward beyond the periphery of the smallest circle circumscribing said flats; they bulge beyond the smallest or circular cross-section at the right end of the pin. The radial or outward swell of the bulge increases progressively in a direct proportion with the width and therefore the depth of the flat, from the right end to the left end of the pin as appears most clearly from a comparison of Fig. 2 with Fig. 3. Each bulging span is of width varying in an inverse ratio with its radial swell as shown, that is, the bulging span is narrowest peripherally of the pin where its radial or outward swell is greatest.

The right end of the pin as shown in Fig. 1 being circular in cross-section, serves as a pilot for ease of insertion of the pin in the hole in which it is to be driven. As the pin is driven into the cylindrical hole, the progressively swelling but narrowing bulges 15 between the progressively widening and deepening flats 10 hug the wall of the bore to progressively greater extent as the fastener is driven in and the metal of the progressively increasing bulges is proportionately displaced or deformed in the bore to a degree permitted by the gaps with respect to the bore, determined by the flats 10, so that as the metal from the bulging spans is forced inward, the metal at the intervening flats is caused to bulge outward toward the wall of the bore. In effect, the fastener is deformed as it is driven in place, resiliently to grip the bore substantially throughout the wall area of the latter and with a particularly effective hold.

When the fastener is driven out of the hole into which it was driven, it will substantially be restored to its original conformation by virtue of its elasticity, within the limits of the elasticity of the material used in the pin.

While the pin could be fabricated in any of various ways, it is preferred to produce it by the more or less generally conventional tool shown in Figs. 4 and 5 in which pin flattening rollers 16 with flat or cylindrical rims 17 are mounted on axles 18 in plungers 19 extending radially of the cam ring 20, the cams 21 of which coact with rollers 22 on the outer parts of the respective plungers. Accordingly, the plungers are forced inward in the rocking movement of the cam ring to exert flattening pressure upon the pin, preferably along equally spaced radii of the pin, in order to produce the progressively increasing compression of the pin $p$ as it is passed axially between the rollers. By the mode of operation set forth, the drive pin is thus readily produced from cylindrical stock, the metal displaced in forming the flats 10 causing bulging of the spans 15 between the flats. The width and the corresponding depth of the flat is a measure of the amount of metal displaced in forming the same, so that the bulge 15 of the spans between the flats will swell radially outward in a direct proportion thereto. The degree of such radial swelling is accentuated by reason of the fact that the bulging span is narrowest where it swells most, since the width of the bulging span varies inversely with the width and depth of the intervening flats. The relationship shown for instance in Figs. 2 and 3 and above described thus results as an incident to the simple operation set forth.

By reason of the substantial cold working of the metal in producing the flattened and bulging areas set forth, it is of course understood that the metal is greatly toughened and that such toughening at each part of the pin is approximately proportional to the width and corresponding depth of the flats and to the corresponding swelling of the intervening bulges. Accordingly, the increased toughness of the pin at each part thereof is proportional to the amount of strain to which the drive fastener is subjected in the process of driving it in place. It is also seen that the entire surface of the pin is worked in the flattening operation, and since substantially that entire surface engages the surface of the bore into which the pin is driven the fastener is particularly effective.

It follows, therefore, that a drive fastener made from a given grade of stock is stronger than one not subjected to the kneading action incurred in the course of its fabrication and the possibility of splitting or cracking the same in the course of application is substantially eliminated.

It will be understood that instead of rollers for producing the flats in the progressive advance of a pin therebetween, solid blocks may be employed of corresponding contour to produce the desired flats by a single thrust, as will be obvious to those skilled in the art.

Depending upon the construction and number of the rollers in Figs. 4 and 5, drive pins with various numbers and shapes of flats may be produced, a few of which are illustratively shown.

In the embodiment of Figs. 6 and 7 the flats 25 are of uniform width for practically the entire length of the pin, and gradually taper off at the extremity only, as at 26 to an apex 27 which is near the inlet or pilot end of the pin. At the taper portion as best shown in Fig. 7, the contour of the flat is curved rather than straight, so that the end part of the flat curves longitudinally to merge into the cylindrical surface of the end 28 of the pin as shown.

In the embodiment of Fig. 8, the triangular flats 29 are shown as in Figs. 1, 2 and 3 except that these extend with the apex 30 midway of the length of the pin, the other half of the pin remaining cylindrical as at 31.

In Figs. 9 and 10 is shown an arrangement which may also be produced either by rollers or by compression blocks with cam control as in Figs. 4 and 5. In this embodiment the flats 32 are of maximum width along the cross-section shown in Fig. 10, and gradually taper off therefrom in width to an apex 33 near one end of the pin and to another apex 34 near the middle of the pin, which is nearer the portion of greatest width. In this embodiment the flat is flat only in transverse cross-section, but is curved in longitudinal cross-section of the drive pin as best shown in Fig. 10. The bolt bulges substantially at 35 in the spans between the flats at the portion of greatest displacement of metal, that is at that region where they are widest and deepest and where the maximum holding effectiveness is to occur.

In the embodiment of Fig. 11 the construction is generally similar to that of Figs. 9 and 10, except that the flats 37 are of symmetrical shape, symmetrically arranged at the middle of the length of the pin with the apices 38 spaced considerably from the ends of the pin.

It is to be understood that each of the various drive pins disclosed is preferred for the purpose for which it is designed and the embodiment of Figs. 1, 2 and 3 is not to be deemed preferable to the other embodiments, merely because it was described first for convenience in exposition.

It will be understood that any of the embodiments shown could be made with three, four or more flats, and if desired, with only one or two flats. Fig. 12 illustratively shows the construction of a pin with four such flats. It will also be understood that any of numerous other designs of drive pin or fastener could be made within the scope of the claims.

The drive pin of the present invention can of course be made with a head produced desirably by cold heading operation on the same machine that forms the flats.

As many changes could be made in the above article and method and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent is:

1. A drive pin having flats extending along a portion of the length thereof, the transverse cross-section of said fastener through said flats being inscribed in a regular polygon whose sides extend along the transverse dimension of the flats, each cross-section presenting curved spans connecting the flats, and bulging outward beyond the periphery of the smallest circle circumscribing said flats.

2. A drive pin having flats extending along a portion of the length thereof, the transverse cross-section of said pin through said flats being inscribed in a regular polygon whose sides extend along the transverse dimension of the flat, each cross-section presenting curved outwardly bulging spans connecting the flats, the width of the flats changing progressively lengthwise of the pin and the outward swelling of the corresponding intervening bulges varying in a direct proportion with the widths of the corresponding flats.

3. A drive fastener comprising a generally cylindrical pin having flats along a portion of the length thereof, each of said flats being of maximum width between the ends thereof and tapering off to merge with the cylindrical surface of the pin at opposite ends thereof, the span of the pin surface between consecutive flats bulging at each region thereof to an extent varying in direct proportion to the width of the flats at said region, each flat being curved in cross-section longitudinally of the fastener.

4. The combination recited in claim 3 in which the flats terminate at a distance from each end of the pin.

5. The combination recited in claim 3 in which each flat extends from substantially one end of the fastener to a point remote from the other end of the fastener.

CECIL C. RICHARDS.